Patented Nov. 9, 1948

2,453,494

UNITED STATES PATENT OFFICE 2,453,494

FLUORENONE DIELECTRIC COMPOSITION

Frank M. Clark, Pittsfield, Mass., assignor to General Electric Company, a corporation of New York No Drawing. Application August 12, 1947, Serial No. 768,276

3 Claims. (Cl. 252—65)

The present invention comprises a range of compositions containing both halogenated and unhalogenated fluorenone. Such compositions, which are solid at ordinary temperatures, are suitable for insulating and dielectric application in electric devices such as capacitors, electric bushings, pot heads, cable joints and other electric apparatus.

As consequence of my present invention, compositions have been provided which have a combination of properties rendering them superior for functioning as dielectric elements in capacitors intended for specialized services, for example, in electronic devices, such as radio receivers, and other unidirectional circuits, also for fluorescent lamp outfits, for combination with motors for starting and operating and other low voltage alternating current circuits. In all such cases minimum size for a given capacity is desired.

Heretofore, electric devices for which solid insulating or dielectric materials were desired have been provided with various waxy materials, for example, a natural wax, such as paraffin or other petroleum wax or a synthetic wax such as chlorinated naphthalene. Paraffin wax melts at temperatures as low as about 50° C. and besides has a dielectric constant of only about 2 or 2.2. The so-called micro-crystalline waxes are characterized by somewhat higher melting points but such waxes also have low dielectric constants. Another solid material which has been used for capacitor impregnation is tetrachlor naphthalene (also known as Halowax) which has a dielectric constant of about 4.3. However, it is objectionable because of its toxicity and marked crystallinity. Its unfavorable dielectric properties have rendered it usable only for low voltage devices. A demand hence has arisen for solid waxy dielectric and insulating materials which are free from such limitations.

My present invention provides dielectric and insulating materials having a desired combination of properties one component of which is a halogenation product of the organic compound fluorenone. The halogenation products are solid at temperatures as high as about 100° C. They have higher dielectric constants than the waxy dielectric and insulating material which have been used heretofore.

It has heretofore been found that when an aromatic hydrocarbon is chlorinated, the product obtained is a mixture of isomers. Unless highly chlorinated the product is a liquid having physical properties which are dependent on the degree of chlorination. Illustrative compositions of such liquid isomeric mixtures are chlorinated diphenyl, chlorinated diphenyl oxide, chlorinated diphenylene oxide, chlorinated diphenyl ketone and chlorinated diphenyl methane. The chlorination of naphthalene yields a solid product suitable for dielectric use only when the introduction of chlorine is carried at least as far as the trichlor and preferably to the tetra- or pentachlor stage.

Solid compositions of the chlorinated type, which have been found of practical utility are characterized by a dielectric constant which is less than about 4.5. Solid compositions of higher dielectric constant have been sought for capacitor impregnation. It is desired that such composition shall possess a melting point of at least 80° C. and preferably higher than 100° C. in order to avoid leakage of liquefied impregnant from the capacitor at such elevated operating temperatures. For reasons of space and utility, capacitors for the fields of use stated are preferably contained in cases which are not leak proof, as, for example, paper tubes. An impregnant of sufficiently high melting point eliminates the necessity of using a metal container with accompanying bushings which require expensive manufacturing operations.

A desired high melting point impregnant must be accompanied by good dielectric properties. It is furthermore desired that the impregnant should be chlorinated to as small amount as possible in order to reduce the weight of the capacitor. All these and other advantages are possessed by the fluorenone compositions of the present invention. Capacitors impregnated with such compositions are characterized by small physical size per microfarad capacity and have good dielectric stability under voltage.

Fluorenone is a yellow solid crystalline material which melts at 84° C. and boils at 341° C. at atmospheric pressure. Chemically, fluorenone is a condensed aromatic ketone compound having the formula:

The crystallinity and other properties of fluorenone make it unsuitable per se as an impregnant for capacitors. The fact that fluorenone (which also may be termed diphenylene ketone) when suitably halogenated yields waxy products of relatively high melting point was unexpected as analogous halogenation products of similar compounds are liquid. The halogenated fluorenones, however, have melting points ranging as high as 125° C. Their dielectric constants are materially above the range of dielectric constants which heretofore were associated with materials of similar kind.

In the preparation of compositions embodying my invention, chlorine is the preferred halogen although other halogens, particularly bromine, are of utility. Preparatory for chlorination, suitably purified fluorenone preferably is dissolved in an inert solvent, for example, carbon tetrachloride or tetrachlor ethane. For example, 300 parts of fluorenone may be dissolved in 750 parts of carbon tetrachloride, reactants being both by weight. Chlorine gas is passed into the solution at about 60° C. in the presence of a suitable catalyst, for example, iron. The temperature is not critical, but it should be below the boiling point of the liquid. After a desired amount of chlorine has been introduced, as may be determined from the increase in weight, the solution is treated to remove the dissolved hydrogen chloride which is a by-product of the reaction. This may be done by blowing the solution with air or nitrogen or by washing with hot dilute alkali or both. As an alkali wash, a 3% aqueous solution of sodium hydroxide is suitable. The washing temperature may be 60° C. although it is not critical. When the solution has attained a desired neutrality, the solvent is removed, for example, by evaporation, yielding the desired product as a residue.

Chlorinated fluorenone is a yellow crystalline solid. In one modification of my invention, I prefer to blend the chlorinated fluorenone with unchlorinated fluorenone in order to provide products of improved physical properties for use as capacitor impregnants. Such blends are resinous in physical structure.

I prefer, however, to so carry out the chlorination as to obtain as a product, a mixture of chlorinated and unchlorinated materials. Monochlor fluorenone contains about 16.7% chlorine; hence, by so carrying out the chlorination as to obtain a product containing less than 16.7% chlorine, a mixture consisting of 78% chlorinated and 22% unchlorinated fluorenone is obtained.

Composition 1

Such a product containing about 13% chlorine, is a yellow solid having a melting point in the range of about 80 to 95° C., and boiling in the range of 180 to 210° C. under 8 mm. pressure. This product has a dielectric constant of about 6.8, and hence compares favorably with chlorinated naphthalene which, as above stated, has been used as a dielectric in capacitors and has a dielectric constant of about 4.3. Capacitors impregnated with the described partially chlorinated fluorenone product, have a higher electrical capacitance.

In the preparation of another modification of my invention, the chlorination of the fluorenone is carried out as previously described, the chlorination, however, being continued until the chlorine content of the product obtained is 18.1%. The resulting solid product melts in the range of 115 to 120° C. Such a melting point is desirable for an impregnant of capacitors of the tubular type since it permits capacitor operation at temperatures even as high as 100° C. without danger of leakage of fused impregnant. The dielectric constant of this composition is 7.5 and the composition consists chiefly of the mono chlor fluorenone with small but significant proportions of the dichlor fluorenone and some unchlorinated fluorenone. A typical combination is as follows:

Composition 2

| | Percent |
|---|---|
| Monochlor fluorenone | 76 |
| Dichlor fluorenone | 21 |
| Unchlorinated fluorenone | 3 |

Compositions suitable for dielectric applications can be obtained by blending the essential components, each prepared separately by chlorination of fluorenone as described. In accordance with this latter modification of my invention, wide variations in composition are possible.

In the preparation of one such composition I may prepare, separately, the monochlor fluorenone and dichlor fluorenone. These are then blended to produce a resinous solid having the following composition:

Composition 3

| | Percent |
|---|---|
| Monochlor fluorenone | 65 |
| Dichlor fluorenone | 20 |
| Unchlorinated fluorenone | 15 |

This composition has a softening point of about 65° C. and a melting point in the range from 85 to 100° C. It boils in the range from 140 to 170° C. under 1 mm. of pressure and at room temperature is a yellow resinous solid. The dielectric constant is 5.

The products embodying my invention are chemically stable and are characterized by electrical properties such as low power factor and high resistance to electric breakdown which render them suitable for dielectric purposes in capacitors and other electrical apparatus either along or associated with other dielectric materials. Illustrative of mixtures of fluorenone products and other dielectric materials are compositions consisting of chlorinated naphthalene or chlorinated anthracene. In such compositions I prefer to use the monochlor fluorenone as the major constituent in order to obtain the highest dielectric constant.

Composition 4

One such composition consists of 70% monochlor fluorenone, 20% chlorinated naphthalene known as Halowax 1001 and 10% unchlorinated fluorenone.

The following comparative figures will illustrate the advantage of dielectric use of chlorinated fluorenone:

| Capacitor Dielectric Material | Capacity, Microfarads |
|---|---|
| Mineral wax | .17 |
| Chlorinated naphthalene | .21 |
| Fluorenone Composition 1 | .25 |
| Fluorenone Composition 2 | .30 |

The capacitors impregnated with the fluorenone compositions are characterized by operating with power factor less than 1% and having a direct current resistance of at least about 4000 megohms microfarad. They are suitable for operation in both alternating and direct current circuits. They are particularly suitable for operation in ignition apparatus, radio receivers and in fluorescent lamp circuits for power factor correction.

What I claim as new and desire to secure by Letters Patent of the United States is:

1. A composition which is suitable for the impregnation of paper-spaced capacitors consisting of the following ingredients in the approximate proportions indicated:

| | Percent |
|---|---|
| Monochlor fluorenone | 65-76 |
| Dichlor fluorenone | 20-21 |
| Unchlorinated fluorenone | 15- 3 |

2. A composition which is suitable for the impregnation of paper-spaced capacitors consisting of the following ingredients in the approximate proportions indicated:

| | Percent |
|---|---|
| Monochlor fluorenone | 76 |
| Dichlor fluorenone | 21 |
| Unchlorinated fluorenone | 3 |

3. A composition which is suitable for the impregnation of paper-spaced capacitors consisting of the following ingredients in the approximate proportions indicated:

| | Percent |
|---|---|
| Monochlor fluorenone | 65 |
| Dichlor fluorenone | 20 |
| Unchlorinated fluorenone | 15 |

FRANK M. CLARK.

REFERENCES CITED

The following references are of record in the file of this patent:

UNITED STATES PATENTS

| Number | Name | Date |
|---|---|---|
| 2,099,441 | Heckert | Nov. 16, 1937 |

FOREIGN PATENTS

| Number | Country | Date |
|---|---|---|
| 433,070 | Great Britain | Aug. 8, 1935 |